United States Patent [19]

Yamada et al.

[11] Patent Number: 5,231,548
[45] Date of Patent: Jul. 27, 1993

[54] ROTARY DRUM CONTROLLER

[75] Inventors: Makoto Yamada, Tokyo; Masayoshi Noguchi, Chiba; Junji Ono, Tokyo; Toshihiko Takahashi, Chiba, all of Japan

[73] Assignee: Sony Corporation, Tokyo, Japan

[21] Appl. No.: 635,759

[22] Filed: Dec. 28, 1990

[30] Foreign Application Priority Data

Dec. 30, 1989 [JP] Japan .................. 1-340268

[51] Int. Cl.$^5$ ............................. G11B 5/588
[52] U.S. Cl. ............................. 360/70; 360/75
[58] Field of Search ........................ 360/70, 75

[56] References Cited

U.S. PATENT DOCUMENTS

| | | | |
|---|---|---|---|
| 3,038,104 | 6/1962 | Wessels ............................ | 361/244 |
| 4,216,419 | 8/1980 | van Dam et al. .................. | 388/813 |
| 5,008,763 | 4/1991 | Horino ............................. | 360/70 |

FOREIGN PATENT DOCUMENTS

| | | |
|---|---|---|
| 0326255 | 8/1989 | European Pat. Off. . |
| 2922816 | 12/1980 | Fed. Rep. of Germany . |
| 981754 | 1/1965 | United Kingdom . |

OTHER PUBLICATIONS

Patent Abstracts of Japan, vol. 13, No. 203 (P-870), May 15, 1989 & JP-A-01 023 463 (Yamaha Corp.) Jan. 26, 1989.

Patents Abstracts of Japan, vol 11, No. 299 (P-621), Sep. 29, 1982 & JP-A-62 092 172 (Canon) Apr. 27, 1987.

*Primary Examiner*—Joseph L. Dixon
*Assistant Examiner*—David L. Robertson
*Attorney, Agent, or Firm*—Hill, Steadman & Simpson

[57] ABSTRACT

A controller for a rotary drum comprising a measuring module which measures occurrence times of a drum frequency signal that repeatedly and periodically occurs per one revolution of the rotary drum. A divisional time producing module produces a plurality of divisional times obtained by adding successive integer multiples of a period reference for the drum frequency signal to an occurrence time of a phase reference signal that is used for internal signal processing. A rotary drum controlling module computes a plurality of phase errors, each determined by the difference between an occurrence time of the drum frequency signal and an associated divisional time, and controls the phase of the rotary drum based on the phase errors. Accordingly, the controller can quickly establish the desired synchronism of the rotary drum with the phase reference signal.

2 Claims, 5 Drawing Sheets

ROTARY DRUM CONTROLLER

BACKGROUND OF THE INVENTION

The invention generally pertains to controllers for rotary drums and is applicable, for example, to a digital audio tape recorder having a rotary drum.

A rotary digital tape (DAT) recorder is a type of tape recorder that is capable of recording audio signals with a high density of packing of recorded information. In FIG. 5, there is illustrated a rotary drum 4 of such a DAT recorder, which DAT recorder is designated by the numeral 1.

A magnetic tape 2 recorded with DAT formatted audio data is unrolled from a supply reel of a tape cassette (not shown). The tape 2 is bent by a predetermined angle along a curved surface of the rotary drum 4 while guided by a pair of oblique guides 3A and 3B. After passing by the rotary drum 4, the tape 2 is rolled up onto a take-up reel of the tape cassette by way of a capstan and a pinch roller.

The drum 4 carries a pair of rotary heads 5A and 5B which are spaced 180° apart from each other and have different azimuth angles relative to the tape 2. Each head scans an oblique track of the tape 2 as the drum 4 rotates. The DAT recorder 1 uses the rotary heads 5A and 5B to record and reproduce audio data to and from the magnetic tape 2.

A drum frequency signal $FG_{DR}$ indicative of the rotational speed of the rotary drum 4 and a drum phase signal $PG_{DR}$ indicative of a predetermined phase of the rotary heads 5A and 5B relative to the magnetic tape 2 are provided to a rotary drum controller of the DAT recorder 1 which controls the speed and phase of the rotary drum 4. For example, the drum phase signal $PG_{DR}$ is arranged to occur when one of the heads 5A and 5B reaches an edge of the tape 2.

The drum controller controls the phase of the rotary drum 4 by minimizing the phase difference formed between the drum phase signal $PG_{DR}$ (FIG. 6A) and a phase reference signal $D_{REF}$ (FIG. 6C) that is used for timing recording/playback operations of an internal signal processing LSI of the DAT recorder 1. Further, the drum controller controls the speed of the rotary drum 4 by measuring a period of the drum frequency signal $FG_{DR}$ (FIG. 6B) and converting the difference between the measured period and a reference period to a voltage to drive a drum motor.

It should be noted, however, that the drum phase signal $PG_{DR}$ occurs only once every complete revolution of the rotary drum 4. Because the drum controller controls the phase of the rotary heads 5A and 5B based on the drum phase signal $PG_{DR}$, it can change the phase of the rotary heads only once per complete revolution of the rotary drum. Therefore, a relatively long time is required to establish the desired phase relation (synchronization) between the drum phase signal $PG_{DR}$ and the phase reference signal $D_{REF}$.

This problem is particularly significant when a muted condition is released to initiate recording. Slow response of recording by DAT 1 often makes a user anxious or nervous.

SUMMARY OF THE INVENTION

The present invention provides an improved controller for a rotary drum that is simple in structure and can control the rotary drum phase with higher accuracy.

To this end, in an embodiment, the invention provides a rotary drum controller comprising measuring means for measuring occurrence times of a drum frequency signal that repeatedly and periodically occurs during one revolution of the rotary drum; divisional time producing means for adding successive integer times of a period reference for the drum frequency signal to an occurrence time of a phase reference signal that is used for internal signal processing to produce divisional times; and rotary drum controlling means for computing phase errors each formed between a measured occurrence time of the drum frequency signal and an associated divisional time and for controlling the phase of the rotary drum based on the phase errors.

Such a construction provides much faster response of phase control than achieved by prior art rotary drum controllers which control the rotary drum phase based on a drum phase signal occurring only once a one complete revolution of the rotary drum.

DETAILED DESCRIPTION OF THE PRESENTLY PREFERRED EMBODIMENTS

Figure 4:
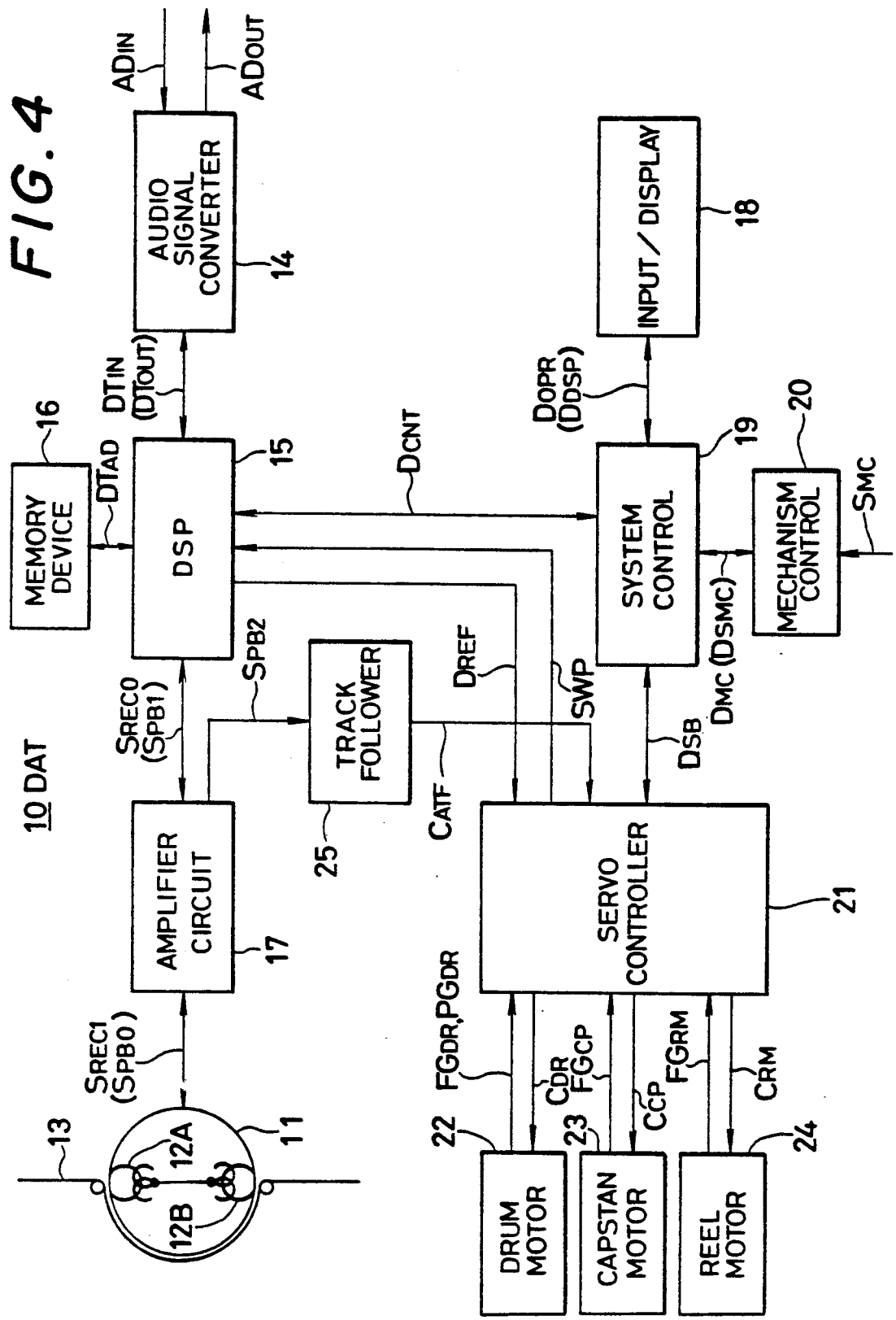
FIG. 4 is a block diagram of a DAT recorder.

In FIG. 4 there is illustrated, in block diagram form, an overall construction of a digital audio tape (DAT) recorder 10. As illustrated, the DAT recorder 10 uses rotary heads 12A and 12B supported on a rotary drum 11 to record an audio signal $AD_{IN}$ (input) on and playback an audio signal $AD_{OUT}$ (output) from a magnetic tape 13 running along a surface of the rotary drum 11.

In the recording mode of the DAT recorder 10, the analog audio input signal $AD_{IN}$ is supplied to an audio signal converter 14. The recording system of the audio signal converter 14 comprises a low pass filter and an analog-to-digital converter. The audio signal converter 14 converts the analog audio input signal $AD_{IN}$ into a corresponding digital signal $DT_{IN}$ and supplies it to a digital signal processor (DSP) 15.

The recording system of DSP 15 receives the digital audio data $DT_{IN}$ and firstly writes same as audio input data $DT_{AD}$ into a memory device 16 of a random access memory (RAM). The recording system of DSP 15 comprises an error-correcting code generator, an interleaving device, an 8-10 modulator, and a parallel-serial converter. Then, the error-correcting code generator thereof reads the audio input data $DT_{AD}$ from the memory device 16, generates error-correcting codes, and writes same into the memory device 16.

All reading and writing operations of the memory device 16 are carried out at interleaved addresses generated by the interleaving device.

The audio input data $DT_{AD}$ with error-correcting codes are read out by the 8-10 modulator. The 8-10 modulator converts each 8 bit audio input data into a 10 bit data suitable for magnetic recording by rotary heads 12A and 12B while adding synchronous, address, subcode, and automatic track following (ATF) signals. The resulting recording data are then converted by the parallel-serial converter to a serial recording signal $S_{RECO}$ which is then supplied to a recording/playback amplifier circuit 17.

The recording system of the amplifier circuit 17 comprises a recording signal amplifier and a rotary transformer. The amplified recording signal $S_{REC1}$ from the recording signal amplifier is supplied through the rotary transformer to the rotary heads 12A and 12B on the rotary drum 11. In this manner, the audio input signal $AD_{IN}$ is processed and recorded on tracks of the magnetic tape 13.

A system control 19, preferably in the form of a microcomputer, selects the recording or playback mode of the DAT recorder 10 in response to console data supplied from an input/display device 18. The input/display device 18 may comprise a microcomputer having a key matrix as an operator's input means and a display panel of liquid crystal display (LCD) elements as a visual display means.

In response to an operator's input, the input/display device 18 produces and supplies console data $D_{OPR}$ to the system control 19. Also the input/display device 18 controls the display on the display panel according to display data $D_{DSP}$ from the system control 19.

In the recording mode, based on predetermined system information and console data $D_{OPR}$ from the input/display device 18, the system control 19 produces and supplies mechanism control data $D_{MC}$, signal processing control data $D_{CNT}$, and servo control data $D_{SB}$ to a mechanism control 20, DSP 15, and servo controller 21, respectively.

During recording, based on the servo control data $D_{SB}$, the servo controller 21 supplies a drum drive signal $C_{DR}$, capstan drive signal $C_{CP}$, and reel drive signal $C_{RM}$ to a drum motor 22, capstan motor 23, and reel motor 24, respectively, to rotate the rotary drum 11 at the desired speed and to feed the magnetic tape 13 at the desired speed.

In response to this, the drum motor 22, via a drum sensor, feeds a drum phase signal $PG_{DR}$ and a drum frequency signal $FG_{DR}$ back to the servo controller 21; the capstan motor 23, via a capstan speed sensor, supplies a capstan frequency signal $FG_{CP}$ to the servo controller 21; and the reel motor 24, via a reel speed sensor, supplies a reel frequency signal $IG_{RM}$ to the servo controller 21.

In this manner, the respective speed and/or phase servo systems are formed and operate.

Also during recording, the servo controller 21 receives from DSP 15 a phase reference signal $D_{REF}$ indicative of one interleave period in the DSP 15. The servo controller 21 uses the phase reference signal $D_{REF}$ to perform speed and/or phase servo functions. Further, the servo controller 21 produces a head change signal SWP from the drum phase signal $PG_{DR}$ and the drum frequency signal $FG_{DR}$ and supplies same to the DSP 15.

The system control 19 sends mechanism control data $D_{MC}$ to the mechanism control 20. Based on the mechanism control data $D_{MC}$, the mechanism control 20 drives mechanisms such as the DAT recorder cassette loading mechanism and magnetic tape loading mechanism. These mechanisms send their sensor information $S_{MC}$ back to the mechanism control 20. From the sensor information $S_{MC}$, the mechanism control 20 produces and sends mechanism data $D_{SMC}$ to the system control 19.

In the playback mode of DAT 10, the servo controller 21 drives the drum motor 22 to rotate at a speed related to servo control data $D_{SB}$ from the system control 19 and synchronizes the drum motor 22 with the phase reference signal $D_{REF}$ from DSP 15 to form a speed and phase servo.

Under the circumstances, a playback signal $S_{PB0}$ is picked up by the rotary heads 12A and 12B and supplied to the amplifier circuit 17. The playback system of the amplifier circuit 17 comprises a rotary transformer, playback signal amplifier, wave form equalizer, and binary circuit. From the playback signal $S_{PB0}$ the amplifier circuit 17 produces and supplies an amplified playback signal $S_{PB2}$ to a track follower 25. Further, the amplifier circuit 17 digitizes the amplified playback signal via the binary circuit and supplies the resultant digital playback signal $S_{PB1}$ to the playback system of DSP 15.

A track follower 25 is designed to provide tracking control by using the synchronous signal and an ATF pilot signal recorded in a recording track on the magnetic tape 13. To this end, the track follower 25 comprises an equalizer for detecting a synchronous signal and an ATF envelope detector. When detecting a synchronous signal from the playback signal, the track follower 25 detects an ATF signal from the envelope signal. From the detected ATF signal the track follower 25 produces an ATF control signal $C_{ATF}$ and sends it to the servo controller 21.

In response to the ATF control signal $C_{ATF}$ the servo controller 21 drives the capstan motor 23 in such a manner that each of heads 12A and 12B keeps track of proper recording tracks on the magnetic tape 13, thereby accomplishing the desired ATF servo. Under the circumstances, the playback system of DSP 15 performs playback operations on the incoming signal $S_{PB1}$.

The playback system of DSP 15 includes a phase locked loop (PLL) clock recovery circuit, a 10-8 demodulator, an error-detecting and correcting circuit, a de-interleaving circuit, and an interpolator.

First, the clock recovery circuit recovers a clock signal from the digital playback signal $S_{PB1}$.

Every time the 10-8 demodulator detects a synchronous signal from the digital playback signal $S_{PB1}$, it demodulates the 10 bit digital playback data $S_{PB1}$ signal into an 8 bit audio data $DT_{AD}$ signal by using clock signals from the clock recovery circuit. The resultant audio data $DT_{AD}$ are successively written into the memory device 16.

Then, the error-detecting and correcting circuit reads the audio data $DT_{AD}$ from the memory device 16 to see if there is an error. When an error is detected, the error-detecting and correcting circuit corrects the audio data $DT_{AD}$ by using the error correcting code contained in it, and writes into the memory device 16 the corrected audio data together with a flag indicative of success/failure of the correction.

All reading and writing operations of the memory device 16 are carried out at de-interleaved addresses generated by the de-interleaving circuit.

The interpolator reads the audio data $DT_{AD}$ from the memory device 16 and performs interpolation (error concealment) for those audio data (error data) that were not successfully corrected by the error-detecting and correcting circuit. The interpolation may be mean value interpolation that replaces error data with the averaged value of its preceding and succeeding audio data. The resultant audio data are supplied as reproduced digital data $DT_{OUT}$ to the playback system of the audio signal converter 14.

The playback system of the audio signal converter 14 comprises a digital-analog converter and a low pass filter. By the conversion of the audio signal converter 14, an analog audio signal $AD_{OUT}$ is produced.

In this manner, audio data recorded on the magnetic tape 13 are read by the rotary heads 12A and 12B on the rotary drum 22, processed and reproduced.

Finally, the servo controller 21 preferably is operative to generate a drum control signal $S_{DR}$ in accordance with the invention. The generation of this signal $S_{DR}$ is discussed below.

Figure 1:
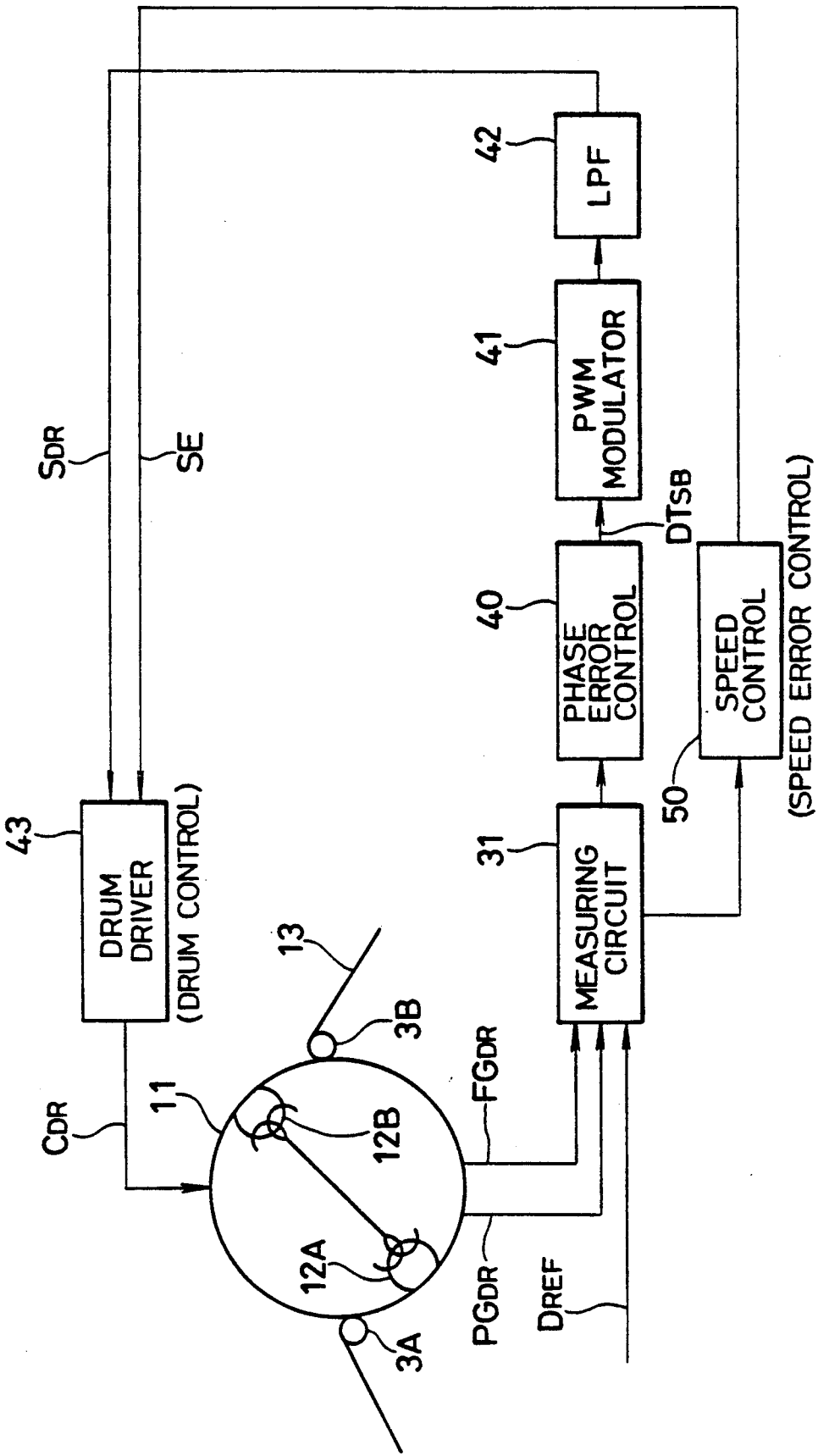
FIG. 1 is a block diagram of a rotary drum controller of a DAT recorder.
Figure 5:
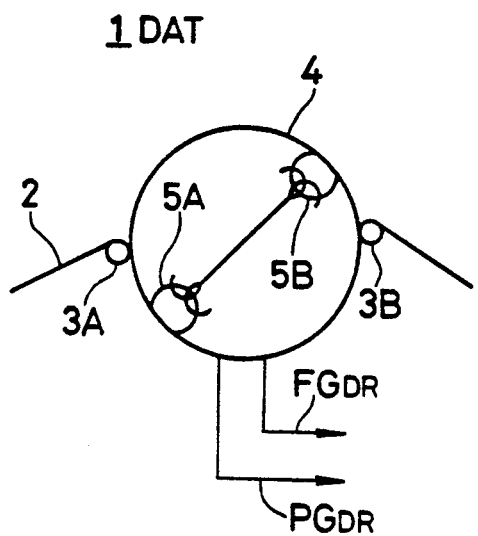
FIG. 5 is a schematic diagram of a rotary drum of a DAT recorder.
Figure 6A:
FIGS. 6A to 6C are timing charts of signals associated with the rotary drum of FIG. 5.
Figure 6B:
Figure 6C:
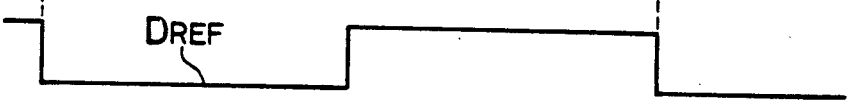

In FIG. 1, there is illustrated a rotary drum controller 30 for the DAT recorder described above. In FIGS. 1, 4, and 5, corresponding components are designated by same reference symbols. The rotary drum controller 30 may form part of the servo controller 21 in FIG. 4, as is indicated by the signal CDR.

The rotary drum controller 30 comprises a measuring circuit 31, a phase error control 40, a pulse width modulation (PWM) modulator 41, a low pass filter 42, a drum driver 43, and a speed control circuit 50. The measuring circuit 31, phase error control circuit 40, PWM modulator 41, and LPF 42 provide phase control.

Figure 3:
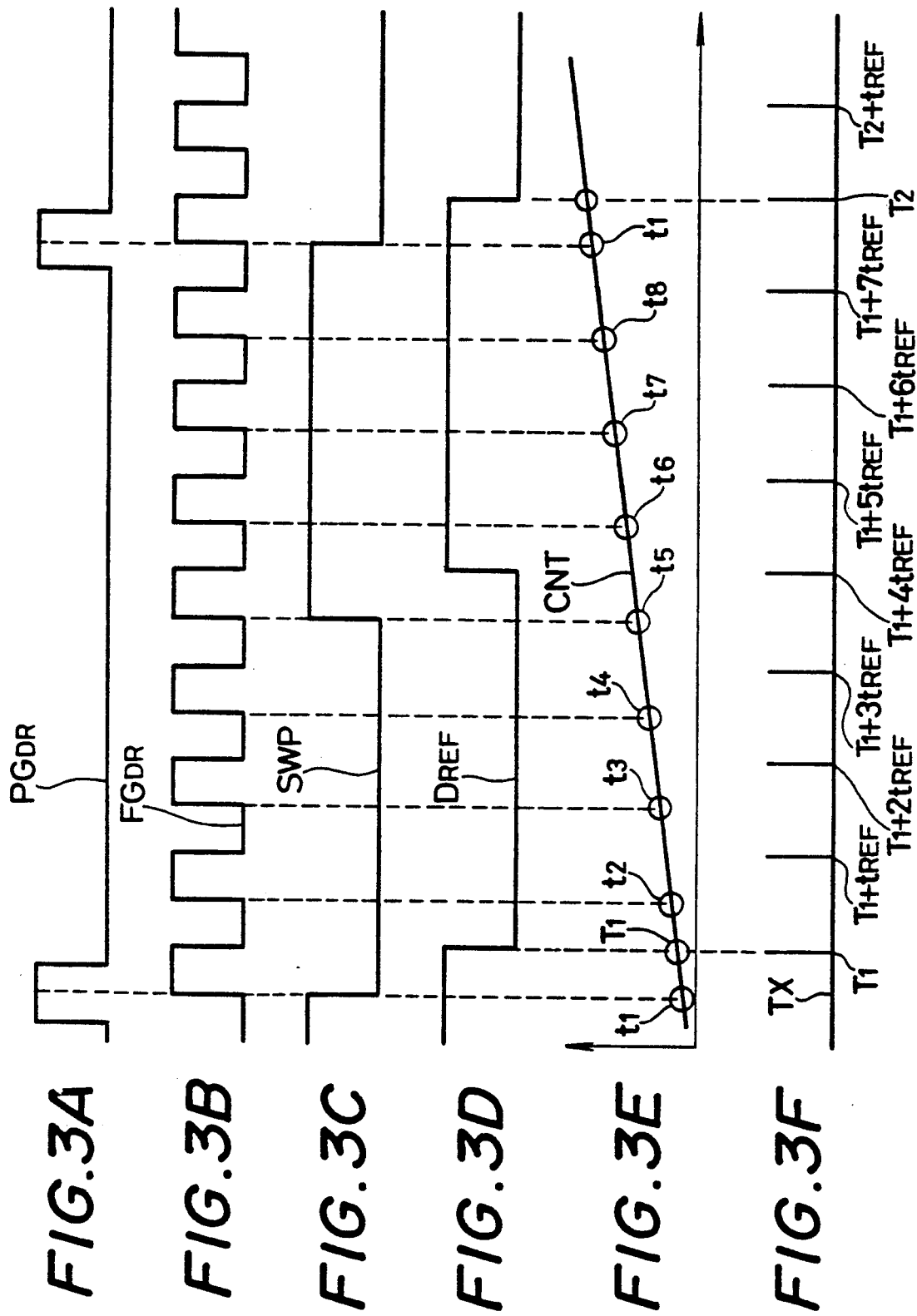
FIGS. 3A to 3F are timing charts of signals present in the controller of FIG. 1.

As illustrated, the measuring circuit 31 receives the drum phase signal $PG_{DR}$ (FIG. 3A) and the drum frequency signal $FG_{DR}$ (FIG. 3B) from sensors of the rotary drum 11, and also receives the phase reference signal $D_{REF}$ (FIG. 3D) from the DSP 15. While phase reference signal $D_{REF}$ is used in DSP 15 for its internal signal processing, in the rotary drum controller 30, the phase reference signal $D_{REF}$ is used as the desired phase reference with which the drum phase signal $PG_{DR}$ should synchronize.

It should be recalled that a pulse of the drum phase signal $PG_{DR}$ occurs once per complete revolution of the rotary drum 11, when the rotary drum 11 passes a predetermined angular phase (e.g., when one of the heads 12A or 12B reaches an edge of the magnetic tape 13 on the rotary drum 11). On the other hand, the drum frequency signal $FG_{DR}$, i.e., a pulse signal thereof, repeatedly and periodically occurs during each revolution of the rotary drum 11.

The rotary drum 11 includes drum frequency signal generating means for generating the drum frequency signal $FG_{DR}$ that occurs each time the rotary drum rotates by a predetermined fractional (e.g., 1/N) revolution. The rotary drum 11 also includes drum phase signal generating means for generating the drum phase signal $PG_{DR}$ that occurs each time the rotary drum passes a predetermined angular phase. It is important that the drum frequency signal $FG_{DR}$ has a frequency higher than that of the drum phase signal $PG_{DR}$. DSP 15 includes phase reference signal generating means for generating a phase reference signal for the drum phase signal. The function of the measuring circuit 31 is to measure occurrence times of the drum frequency signal $FG_{DR}$ and the phase reference signal $D_{REF}$.

Figure 2:
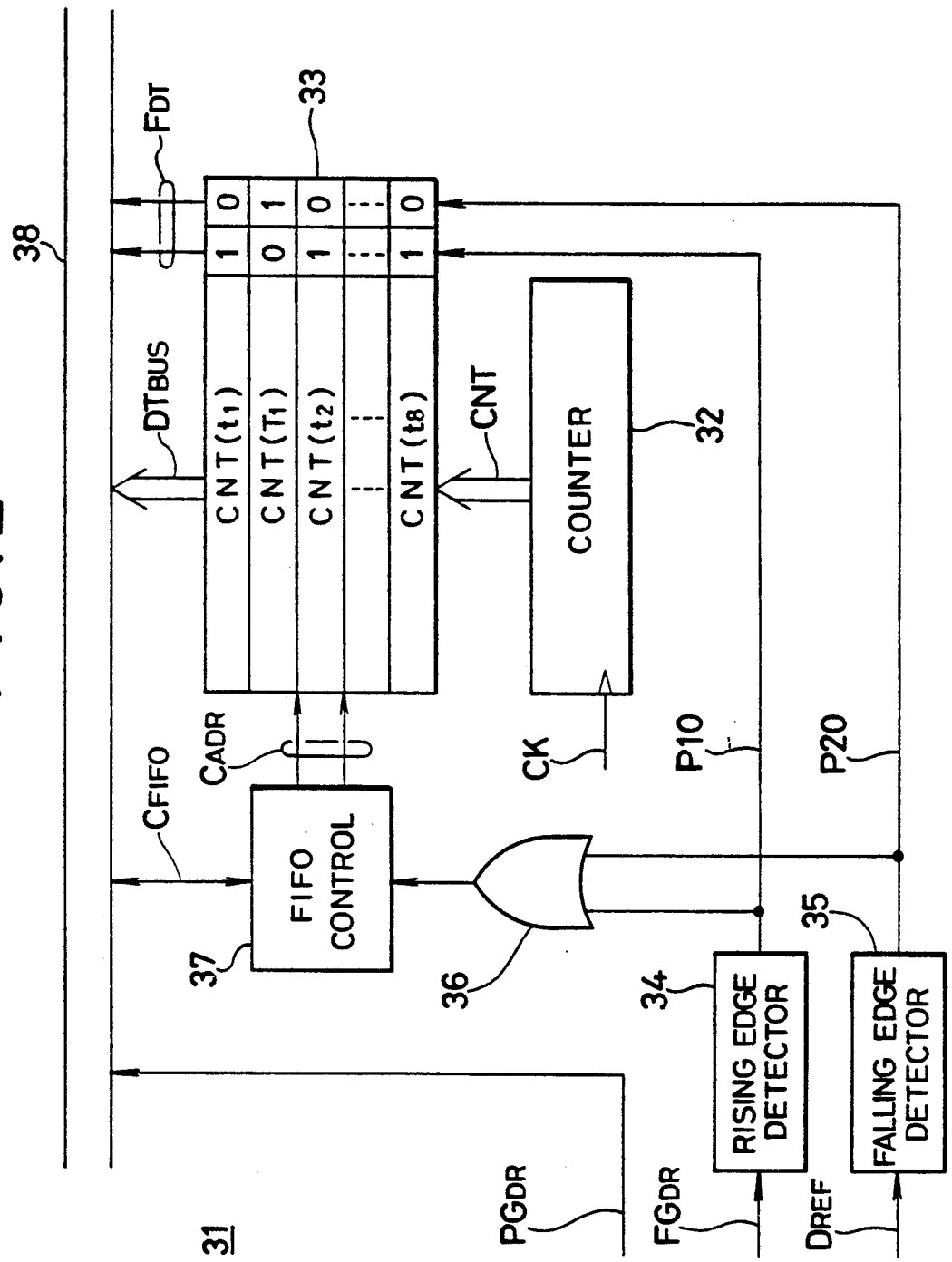
FIG. 2 is a block diagram of a measuring circuit used in the controller of FIG. 1.

In FIG. 2 there is illustrated a block diagram of the measuring circuit 31. The measuring circuit 31 preferably comprises a microcomputer which includes a counter 32, preferably a running counter, and a first-in first-out (FIFO) memory 33 of a predetermined number of words. The counter 32 preferably is a free running counter that counts clock pulses CK having a predetermined relatively high frequency.

As illustrated, a rising edge detector 34 receives the drum frequency signal $FG_{DR}$ and detects a rising edge occurring therein. A falling edge detector 35 receives the phase reference signal $D_{REF}$ to detect a falling edge thereof. A pulse signal P10 generated by the rising edge detector 34 indicative of a rising edge of the drum frequency signal $FG_{DR}$, and a pulse P20 generated by the falling edge detector 35 indicative of a falling edge of the phase reference signal $D_{REF}$ are passed through an OR gate 36 to a FIFO controller 37.

In response to either pulse P10 or P20, the FIFO controller 37 addresses, by issuing appropriate addressing signals $C_{ADR}$, the FIFO memory 33 to store count data CNT from the counter 32. It should be noted that this count data CNT can indicate either an occurrence time of the drum frequency signal $FG_{DR}$ (a rising edge thereof) or an occurrence time of the phase reference signal $D_{REF}$ (a falling edge thereof).

To differentiate between count data relating to an occurrence of the drum frequency signal $FG_{DR}$ and that relating to an occurrence of the phase reference signal $D_{REF}$, the lowest two bits of each word in the FIFO memory 33 are set, in view of the outputs from the edge detectors 34 and 35, as an ID flag $F_{DT}$. For count data relating to the occurrence of the drum frequency signal $FG_{DR}$, the lowest two bits are set to "10", i.e., P10 pulse will set the lowest two bits to "10". For count data relating to the occurrence of the phase reference signal $D_{REF}$, the lowest two bits are set to "01", i.e., a P20 pulse will set the lowest two bits to "01".

In this manner, the FIFO memory 43 sequentially stores count data CNT such as CNT $(t_1)$, CNT $(T_1)$, CNT $(t_2)$, CNT $(t_3)$ and so on (FIG. 3E), together with the ID flags. An upper case T in parentheses indicates $D_{REF}$ count data, while a lower case t in parenthesis indicates $FG_{DR}$ count data.

It is understood that the measuring circuit 31 includes drum frequency signal occurrence time measuring means coupled to the drum frequency signal generating means for measuring occurrence times of the drum frequency signal. Also the measuring circuit 31 includes reference phase signal occurrence time measuring means coupled to the reference phase signal generating means for measuring an occurrence time of the reference phase signal.

The count data CNT and ID flag data $F_{DT}$ stored in the FIFO memory 31 are read out as signals $DT_{BUS}$ and $F_{DT}$, respectively, to the phase error control circuit 40 and speed control 50 through an internal bus 38 based on FIFO control data from the FIFO control 37. Also, the drum phase signal $PG_{DR}$ is supplied to the phase error control circuit 40 by way of the internal bus 38.

The phase error control circuit 40 basically comprises a head change signal generating module, a phase error computing module, and a drum control data generating module. The phase error control circuit 40 monitors the drum phase signal $PG_{DR}$ to detect a rising edge therein. When it detects a rising edge, the phase error control circuit 40 commences examination of the count data CNT from the FIFO memory 33.

The head change signal generating module generates the head change signal SWP from the drum frequency signal $D_{REF}$ and the drum phase signal $PG_{DR}$. In the case indicated by FIG. 3C, the head change signal SWP falls at a reference rising edge of the drum frequency signal $FG_{DR}$ that occurs during a high level period of the drum phase signal $PG_{DR}$, (i.e., occurs immediately after a rising edge of the drum phase signal $PG_{DR}$). Then the head change signal SWP rises at another predetermined rising edge of the drum frequency signal $FG_{DR}$, which in the illustrated case is the fifth of a rising edge in the drum frequency signal $PG_{DR}$.

The speed control module 50 computes speed error data SE which is supplied to the drum driver 43, as illustrated in FIG. 1. More specifically, the speed control module 50 includes a speed error computing module that reads those count data CNT $(t_n)$ $(n=1, 2, 3, \ldots)$ from the FIFO memory 33 indicative of successive occurrence times of the drum frequency signal $FG_{DR}$. From the successive occurrence times $t_1, t_2, t_3 \ldots$, the speed error computing module measures the actual period of the drum frequency signal $FG_{DR}$ which is given by $(t_2-t_1)$, $(t_3-t_2)$ and so on. Then the speed error computing module calculates the difference (speed error) between each actual period data and period reference data $t_{REF}$. The speed error data SE from the speed error computing module are used to control the rotary drum 11 to rotate at the desired speed determined by the period reference data $t_{REF}$.

It should be noted that the reference period data $t_{REF}$ indicates the desired period of the drum frequency signal $FG_{DR}$, and therefore defines the desired speed of the rotary drum 11. The reference period data $t_{REF}$ is initially set in the phase control circuit 40. Thus, the system includes period reference providing means for providing data of a period reference for the drum frequency signal.

The phase error control module 40 computes phase error data PE in a manner described later in accordance with the invention. The phase error data PE are used to synchronize the rotary drum 11 with the phase reference signal $D_{REF}$. In other words, the phase of the rotary drum 11 is controlled based on the phase error data.

The drum control data generating module generates drum control data $DT_{SB}$ based on the speed error data SE from the speed error generating module and the phase error data PE from the phase error generating module.

The drum control data $DT_{SB}$ are supplied to pulse width modulation (PWM) modulator 41. The PWM modulator 41 which converts the drum control data $DT_{SB}$ to a corresponding PWM modulated signal. A low pass filter (LPF) 42 smooths the PWM modulated signal to produce a smoothed control signal $S_{DR}$. A drum driver 43 receives the control signal $S_{DR}$ and supplies the corresponding drive signal $C_{DR}$ to the drum motor.

The phase error computing module 40 of the phase and speed control of the rotary drum controller 30 incorporates features of the invention. Thus, it is appropriate here to describe prior art phase error computing module.

The prior art phase error computing modules compute the phase error $T_1$ employing the following equation:

$$T_1 = t_1 - T_1, t_1 - T_2 \tag{1}$$

The first $t_1$ is an occurrence time of the drum phase signal $PG_{DR}$ (measured at a rising edge of the drum frequency signal $FG_{DR}$ that occurs during a high level period of the drum phase signal $PG_{DR}$) and which indicates first when the rotary drum 11 passes a predetermined angular phase. The second $t_1$ is the next drum phase signal occurrence time after one complete revolution of the rotary drum 11. $T_1$ indicates a first occurrence time of the phase reference signal $D_{REF}$. $T_2$ indicates a second occurrence time of the phase reference signal $D_{REF}$. As can be appreciated, the prior art phase error computing modules compute only a single phase error per one revolution of the rotary drum 11 or per one period of the drum phase signal $PG_{DR}$. Each time a phase error is computed, the rotary drum controller uses it to update drum control data $DT_{SB}$ for phase control of the rotary drum 11. This updating occurs only once per one complete revolution of the rotary drum 11. As a result, prior art rotary drum controllers show slow responses to the phase control and require a relatively long time to establish synchronism of the rotary drum 11 with the phase reference signal $D_{REF}$.

In contrast thereto, the rotary drum controller of the invention can establish, in a shorter time, the desired synchronism between the rotary drum 11 and the phase reference signal $D_{REF}$.

The updating of the drum control data $DT_{SB}$ for the phase control of the rotary drum 11 occurs a plurality of times per one revolution of the rotary drum 11, i.e., as many times as the number of the occurrences of the drum frequency signal $FG_{DR}$ (e.g., 8 occurrences in FIG. 3) during a one period of the drum phase signal $PG_{DR}$. This advantage is primarily derived from a novel manner of computing phase errors.

In accordance with the invention, the phase error computing module of the phase and speed control 40 computes phase errors $T_2$ in accordance with the following equation:

$$T_2 = t_1 - T_1, t_2 - (T_1 + t_{REF}), t_3 - (T_1 + 2t_{REF}), \ldots, t_n - (T_1 + (n-1)t_{REF}) \tag{2}$$

This means that the phase error computing module computes a plurality of phase errors per one revolution of the rotary drum 11, as many as the number of occurrences of the drum frequency signal $FG_{DR}$ during a one period of the drum phase signal $PG_{DR}$. This number is indicated by n in the formula (2) and is 8 in FIG. 3.

To accomplish this, the phase error computing module identifies the count data CNT $(T_1)$ indicative of an occurrence time $T_1$ of the phase reference signal $D_{REF}$ from the contents of the FIFO memory 33 by checking the ID flag $F_{DT}$. Then the phase error computing module successively adds the period reference $t_{REF}$ of the drum frequency signal $FG_{DR}$ to $T_1$ to provide divisional times $T_1$, $T_1+t_{REF}$, $T_1+2t_{REF}$, . . . , and $T_1+(n-1)t_{REF}$ (generally designated by TX in FIG. 3F). The divisional times define the desired occurrence times of the drum frequency signal $FG_{DR}$.

Further, checking the drum phase signal $PG_{DR}$, the phase error computing module identifies the count data CNT $(t_1)$ from the FIFO memory 33 indicative of a reference first occurrence time $t_1$ of the drum frequency signal $FG_{DR}$ that occurred during a high level period of the drum phase signal $FG_{DR}$. The first occurrence time $t_1$ is compared with the occurrence time $T_1$ of the phase reference signal $D_{REF}$, i.e., the first divisional time $T_1$. So the phase error computing module computes the difference between $t_1$ and $T_1$ to obtain a first phase error $(t_1-T_1)$. Using the phase error $(t_1-T_1)$, the drum control data generating module produces new drum control data $DT_{SB}$.

Then, the phase error computing module identifies the count data CNT (t$_2$) indicative of a second occurrence time t$_2$ of the drum frequency signal FG$_{DR}$. The count data CNT (t$_2$) is determined by count data CNT of the drum frequency signal FG$_{DR}$ that succeeds the count data CNT (t$_1$), i.e., count data CNT with ID flag F$_{DT}$"=10" which the phase and speed control 40 receives from the FIFO memory 33 the next time after having received and identified the count data CNT (t$_1$). The second occurrence time t$_2$ of the drum frequency signal FG$_{DR}$ is compared with the second divisional time (T$_1$+t$_{REF}$). So the phase error computing module computes the difference between t$_2$ and (T$_1$+t$_{REF}$) to obtain a second phase error (t$_2$−(T$_1$+t$_{REF}$)), the drum control data generating module updates the control data DT$_{SB}$.

Thereafter, the phase error computing module similarly computes succeeding phase errors t$_3$−(T$_1$+2t$_{REF}$), t$_4$−(T$_1$+3t$_{REF}$), ... and t$_n$−(T$_1$+(n−1)t$_{REF}$) until one revolution of the rotary drum is completed. Based on the phase errors, the drum control data DT$_{SB}$ is successively updated to control the phase of the rotary drum 11. When the next rising edge of the drum phase signal PG$_{DR}$ occurs, the phase error computing module will repeat the phase error computations for the next revolution of the rotary drum 11.

In summary, the prior art rotary drum controller computes phase errors at the rate of one phase error per one period of the drum phase signal PG$_{DR}$, i.e., per one complete revolution of the rotary drum. At a corresponding slow rate, the prior art rotary drum controller updates the phase controlling component of the drum control data DT$_{SB}$ to control the phase of the rotary drum 11.

In the present invention, the rotary drum controller 30 computes phase errors at the rate of one phase error per one period of the drum frequency signal FG$_{DR}$ that repeatedly and periodically occurs during one revolution of the rotary drum 11. To state it another way, the rotary drum controller 30 computes a plurality of phase errors per one revolution of the rotary drum 11. Each phase error is determined by the difference between an occurrence time of the drum frequency signal FG$_{DR}$ and an associated divisional time that indicates a divisional phase reference. At a corresponding fast rate, the rotary drum controller 30 updates the drum control data DT$_{SB}$ to control the phase of the rotary drum 11.

Therefore, the rotary drum controller of the invention provides improved response of the rotary drum phase control over the prior art. The rotary drum controller of the invention can quickly establish the desired synchronism of the rotary drum with the phase reference signal. Thus, a DAT recorder with the rotary drum controller of the invention can start recording immediately after a muted condition is released.

In place of the FIFO memory 33, other storage means such as a random access memory (RAM) and latch circuit may be used to store count data. Further, while the rotary drum controller of the invention has been described as applied to a digital audio tape (DAT) recorder. However, the rotary drum controller of the invention can also be applied to any other suitable apparatus with a rotary drum, such as a video tape recorder (VTR, VCR) and a data recorder.

While a preferred embodiment has been shown, modifications and changes may become apparent to those skilled in the art which shall fall within the spirit and scope of the invention. It is intended that such modifications and changes be covered by the attached claims.

What is claimed is:

1. A controller for a rotary drum comprising:
   means for generating a drum frequency signal having a frequency of occurrence greater than a frequency of rotation of the rotary drum;
   measuring means for measuring occurrence times of the drum frequency signal, said measuring means comprising a running counter and a first-in-first-out memory operatively triggered to store contents of the counter every time an occurrence of said drum frequency signal is detected, and a device for detecting occurrences of said drum frequency signal;
   a period reference for said drum frequency signal;
   means for generating a phase reference signal;
   divisional time producing means for adding successive integer multiples of the period reference for said drum frequency signal to an occurrence time of a phase reference signal that is used for internal signal processing to produce divisional times; and
   rotary drum controlling means for computing phase errors, each formed between a measured occurrence time of said drum frequency signal and an associated divisional time, and for controlling the phase of said rotary drum based on said phase errors.

2. A controller for a rotary drum disposed in a path of a magnetic tape and carrying at least one head for recording data on and playing back data from the magnetic tape comprising:
   drum frequency signal generating means for generating a drum frequency signal each time said rotary drum rotates by a predetermined fractional revolution;
   drum phase signal generating means for generating a drum phase signal each time said rotary drum passes a predetermined angular phase;
   phase reference signal generating means for generating a phase reference signal for said drum phase signal;
   period reference providing means for providing data of a period reference for said drum frequency signal;
   a rising edge detector configured and coupled to detect occurrences of said drum frequency signal by detecting leading edges of pulses therein;
   a falling edge detector configured and coupled to detect occurrences of said phase reference signal by detecting trailing edges of pulses therein;
   a running counter configured to count at a predetermined rate;
   a first-in-first-out memory coupled to said rising edge detector, said falling edge detector and said counter and configured to be triggered by said rising edge detector upon each occurrence of said drive frequency signal and by said falling edge detector upon each occurrence of said phase reference signal so as to store in said memory contents of said counter as said occurrences are detected and associated information identifying which of said signals caused said memory to store said contents of said counter;
   divisional time determining means coupled to said memory and said period reference providing means for adding successive integer multiples of said period reference to said occurrence time of said phase reference signal to determine a plurality of divisional times;

phase error comprising means coupled to said memory, said drum phase signal generating means and said divisional time determining means for computing a plurality of phase errors each determined by the difference between an occurrence time of said drum frequency signal and an associated divisional time; and rotary drum driving means coupled to said phase error computing means for driving said rotary drum based on said phase errors.

* * * * *